United States Patent [19]

Dill, Jr.

[11] Patent Number: 4,518,151
[45] Date of Patent: May 21, 1985

[54] ARTICLE SEPARATOR FOR MATERIALS HANDLING

[76] Inventor: M. Reese Dill, Jr., 15 Carleton Rd., Belmont, Mass. 02178

[21] Appl. No.: 521,609

[22] Filed: Aug. 9, 1983

Related U.S. Application Data

[63] Continuation-in-part of Ser. No. 343,460, Jan. 28, 1982, abandoned.

[51] Int. Cl.³ .............................................. B66F 3/24
[52] U.S. Cl. ................................ 254/93 HP; 414/42; 414/114
[58] Field of Search ............... 414/28, 29, 42, 112, 414/114, 115, 785, 786; 254/89 R, 89 H, 93 HP; 29/239; 410/119; 294/63 A

[56] References Cited

U.S. PATENT DOCUMENTS

| | | | |
|---|---|---|---|
| 2,150,960 | 3/1939 | Bertel | 414/112 X |
| 2,779,487 | 1/1957 | Harris | 254/89 H X |
| 3,669,292 | 6/1972 | Tuura | 254/93 HP X |
| 3,853,230 | 12/1974 | Schultz | 414/392 X |
| 3,986,246 | 10/1976 | Gemmill | 254/93 HP X |
| 4,065,014 | 12/1977 | Sagmiller | 414/114 X |
| 4,116,344 | 9/1978 | Ziemba | 410/119 |

FOREIGN PATENT DOCUMENTS

| | | | |
|---|---|---|---|
| 2802716 | 7/1979 | Fed. Rep. of Germany | 254/93 HP |
| 399317 | 3/1966 | Switzerland | 254/93 HP |
| 2023231 | 12/1979 | United Kingdom | 254/93 HP |

*Primary Examiner*—Leslie J. Paperner
*Attorney, Agent, or Firm*—Wolf, Greenfield & Sacks

[57] ABSTRACT

Portable, inflatable apparatus which, in a deflated condition, can be manually pushed into vertical spaces between stacked articles and which, in an inflated condition, vertically separates stacked articles sufficiently for insertion between the stacked articles or withdrawal therefrom of the forks of a forklift. This apparatus is particularly suited for handling loads which are stored on stickers or dunnage having a minimal thickness on the order of one inch or less. Typically, this apparatus includes an elongated, rigid framework, an inflatable bladder secured to the framework, and valves for inflation and deflation of the bladder. This framework can either be a rigid skid upon which the bladder rests or it can be a metal frame surrounding the bladder, and between portions of which the bladder is stretched.

7 Claims, 9 Drawing Figures

ARTICLE SEPARATOR FOR MATERIALS HANDLING

CROSS REFERENCE TO RELATED APPLICATION

This application is a continuation-in-part of co-pending application Ser. No. 343,460, filed Jan. 28, 1982, now abandoned.

FIELD OF THE INVENTION

This invention relates generally to handling of stacked articles or materials and more particularly concerns a device for vertical separation of stacked articles or materials for insertion or withdrawal of the arms of a lifting device.

BACKGROUND OF THE INVENTION

Often articles or materials are stored or shipped by stacking them one on top of the other with only a thin dunnage or wooden stickers providing spacing therebetween. Common examples of such articles or materials are lumber, plywood, hardboard, or other unpalletized building materials, pieces of which are stacked for drying, storage or transportation and are vertically separated by wooden stickers which are approximately 1 inch or less thick. These stickers are usually placed about 1 to 1½ feet apart along the length of the materials. The provision of the stickers allows for air circulation and ties the load together. However, piles of such materials stacked in this manner, often weigh substantially more than the capacity of a standard forklift, and the entire pile cannot be moved at once. In addition, the piles of materials may be loaded onto vehicles at one facility with a forklift of a capacity sufficiently great to handle the entire stack while they are unloaded at another facility by a forklift having a lesser capacity. Most forklifts, especially those having capacities adequate to lift a stack of undried lumber, have fork arms which have a vertical thickness greater than the 1-inch thickness of the stickers. As a result, the entire load must be lifted at once by the forklift or the pile must be loaded by hand. In the past, in order to overcome the above problems, bolsters or other large dunnage have been placed under the bottom layer of lumber or other building materials, or at appropriate points between the layers. These bolsters are normally 4-inch by 4-inch by 5-foot long timbers and are expensive and difficult to handle. In addition, the placement of these bolsters severely reduces the amount of lumber or building materials which may be stacked in a given height, thus restricting the capacity of the kiln or facility where the material is stored.

Another commonly used solution to the above problem is to place the lumber or other building materials or the stacked articles on pallets. However, most conventional pallets which can be unloaded by a conventional forklift must have strong supporting stringers in order to carry the desired load and provide the 3- to 4-inch clearance beneath the load necessary for fork entry, and the cost of such pallets is often too high to justify shipping it with the materials. In addition, the pallets must be stored with the goods, requiring additional storage space and significantly increasing storage costs. This cost problem in palletized materials is often overcome by the use of disposable pallets without stickers or stringers necessary to provide the desired clearance and which may be formed of corregated materials. An example of such pallets is described in U.S. Pat. Nos. 2,302,137 and 2,328,397. The forks of a forklift must be wedged beneath such a pallet to lift it, and a lift with special chisel forks must be used, or in some cases, the pallet must be pulled onto the fork arms using a special load-pulling device. This chiseling often damages the goods and the load-pulling device requires the use of a very high sheer strength corregated material which is quite expensive.

Inflatable pallets, such as those described in U.S. Pat. Nos. 3,440,976; 3,790,010; 3,913,964 and 4,116,344 may overcome some of the above problems with palletized materials. However, such pallets must still be left with the load during shipping or until the article is used, and these pallets tend to be expensive, increasing handling and storage costs.

SUMMARY OF THE INVENTION

According to the invention, an inexpensive, easy-to-use apparatus is disclosed for providing the required separation between stacked materials or articles for the insertion of the arms of a forklift. This invention obviates the requirement for storing loads on pallets or bolsters in order to provide sufficient separation for the fork arms. With this invention, layers of stacked materials or articles need only be separated by one-inch high or less stickers or other dunnage placed therebetween. This invention also obviates fork arms which are designed to be wedged between the layers of stacked articles or materials for separation thereof and avoids the damage and problems normally produced thereby.

This invention includes an elongated, inflatable bladder which is relatively rigid in the direction of elongation. In one embodiment rigidity is provided by a skid to which the bladder is secured. In its uninflated condition, the bladder and skid together typically are no higher than ¾-inch, which is less than the thickness of a typical sticker. A valve is provided for inflation of the bladder, and an aspirator and another valve are provided for deflation of the bladder. When the bladder is inflated, it has a vertical dimension greater than the thickness of typical forklift arms. Stacked materials or articles placed thereon are raised a similar distance. Elastic straps tension the bladder in the direction of elongation to collapse it to the desired height and to secure it to the skid. The straps have sufficient elasticity to allow inflation of the bladder while tensioning the bladder and retaining the bladder in a fully extended position on the skid.

In another preferred embodiment, rigidity is provided to the bladder by a metal framework which surrounds the bladder on its sides but which does not extend above or below the bladder where it contacts the stacked materials. The bladder is stretched between portions of the metal framework to maintain the desired configuration. In this other embodiment, because there is no skid, the total thickness of the apparatus in its deflated condition is equal to the thickness of the metal framework which is about ⅜-inch.

In use, the bladder is inserted between two stacked articles or materials in the space provided by the stickers, and the bladder is inflated. The fork arms may then be inserted between the articles or layers of material for lifting and moving of the materials or articles. When the operation has been completed, the bladder is deflated and recovered for use elsewhere. Either two apparatus or one apparatus and a bolster may be used for this purpose.

This apparatus can also be used for offloading materials or articles onto stacks thereof or onto a level surface without the need of pallets. In this instance, the bladder along with stickers are placed on the surface upon which the materials or articles are to be located. The bladder is then inflated to its desired height, and the articles or materials are placed thereon by the forklift. The fork arms are withdrawn in the space provided by the inflated bladder, and the bladder is then deflated, allowing the materials or aticles to come to rest on the stickers. Thereafter, the apparatus may be removed for use elsewhere. This same result can be achieved by using a single apparatus in conjunction with a movable bolster. Thus, either a single apparatus or one pair of this apparatus can be used for offloading or onloading a large quantity of material, and they need not be left with the materials thereafter as is the case with pallets.

DESCRIPTION OF THE DRAWINGS

The objects, advantages and features of this invention will be more clearly appreciated from the following detailed description taken in conjunction with the accompanying in which.

DETAILED DESCRIPTION OF THE PREFERRED EMBODIMENTS

With reference to the drawing and more particularly, to FIGS. 1 through 4 thereof, apparatus 10, which represents one embodiment of this invention, includes an inflatable bladder 14 elongated in one direction and resting on a skid 12. Bladder 14 is typically secured to one end of skid 12 by adjustable nonelastic straps 16 and to the opposite end of skid 12 by elastic strap 18. Bladder 14 is sealed at each end, typically by plates 20 which are bolted together. An inflation valve 24, a deflation valve 26 and an aspirator 28 are provided at one end of bladder 14.

Figure 3:
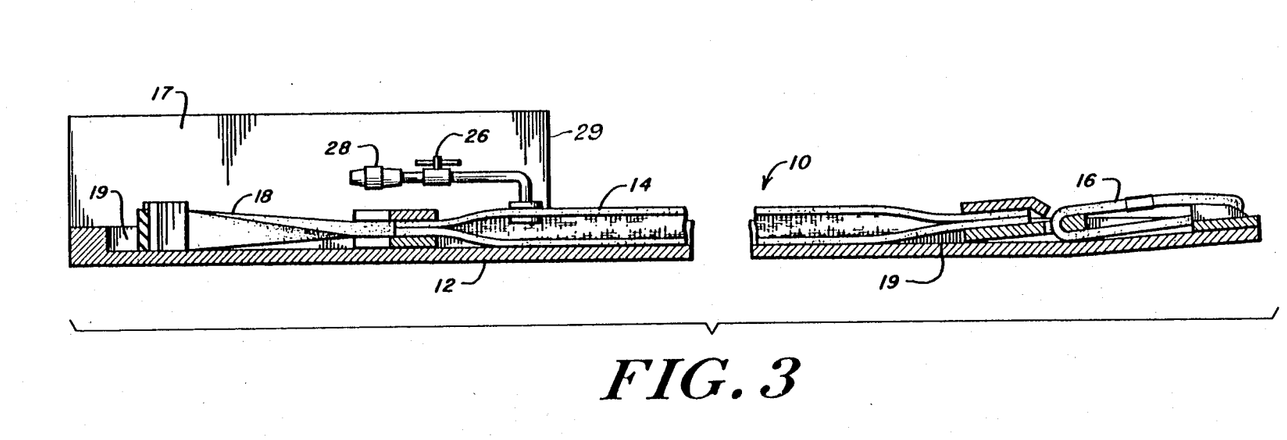
FIG. 3 is a cross-sectional side view of the apparatus of FIG. 1.
Figure 4:
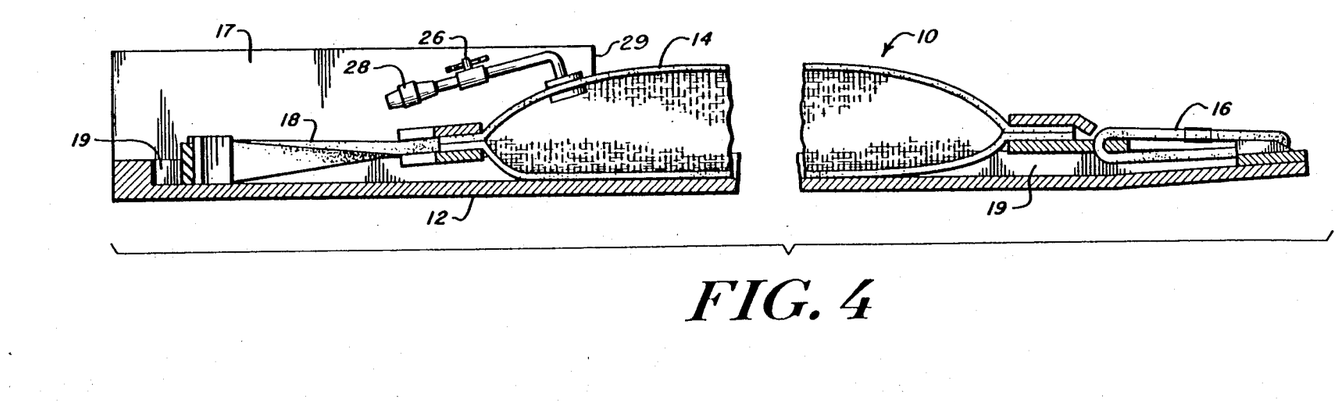
FIG. 4 is a cross-sectional view of the apparatus of FIG. 1 in an inflated condition.

Straps 16 and 18 are secured to plates 20 typically either by bolts or by slots 22. Straps 16 and 18 insure that bladder 14 is tightly stretched between the two ends of skid 12 to collapse it down to the required height when deflated and to maintain it in a desired orientation, whether it is deflated as shown in FIG. 3 or inflated as shown in FIG. 4. Strap 18 is sufficiently elastic to permit the longitudinal shrinkage and vertical movement that occurs as bladder 14 is inflated and to still maintain the desired tension on the bladder when deflated so that it is tightly stretched on skid 12 and does not have portions thereof that extend above the desired height. Strap 16 has a buckle 11 for adjustment of the tension on bladder 14.

In its uninflated condition, bladder 14 and skid 12 together have a vertical height no greater than ¾-inch which is less than the one inch thickness of a typical sticker, excluding the height of inflation valve 24, deflation valve 26 and aspirator 28. Typically, the vertical height of the apparatus 10 when bladder 14 is deflated is about one-half inch. When inflated, bladder 14 and skid 12 together must have a vertical height at least equal to the thickness of a typical forklift arm, typically about 3 to 5 inches. The inflation valve, the deflation valve and the aspirator usually are not placed in the narrow space between the stacked articles or materials, but extend beyond the stacked articles or materials for easy access thereto during operation of the apparatus. Therefore they are not subject to the height restrictions imposed on the remainder of the apparatus.

Skid 12 of this invention typically is flat, and rectangularly shaped and possesses sufficient rigidity to prevent it from buckling under the stresses caused by inflation of the bladder. The skid provides a structure sufficiently rigid to be manually pushed into the ¾- to 1-inch high space between stickers, spaces or other dunnage. The skid may be composed of metal, wood or any other suitable material. Skid 12 preferably is formed of ⅛-inch sheet metal and the required rigidity is provided by one-half-inch high side walls 19 which extend the length of the skid. Walls 19 may be formed of ⅛inch sheet metal which has been folded over onto itself or of any other material that provides the desired rigidity. Walls 17 may also be provided on either lateral side of skid 12 adjacent inflation valve 24, deflation valve 26 and aspirator 28 for protection thereof. Walls 17 extend from the end adjacent the valves toward the opposite end of the skid to the point where the valves enter the bladder. Walls 17 typically have a height generally equal to the height of the valves above the bottom of the skid. Vertical surfaces 29 of walls 17 act as stops which engage the projecting edge of the stacked articles or materials to protect the valves. A handle 15 may be provided on each lateral side of the skid on the end thereof adjacent the valves. Handles 15 permit easy manual handling and insertion and withdrawal of the skid from the stacked articles or materials. A typical skid length is 60 to 108 inches and a typical skid width is 7 to 10 inches. A typical 72-inch skid together with the bladder weighs about 30 pounds. the end of skid 12 adjacent straps 16 may be provided with a slight upward or angular tilt, as shown in FIG. 3 to facilitate entry of skid 12 into the narrow vertical space between the articles provided by the stickers or dunnage. Also, this upward tilt insures that bladder 14 inflates evenly along its length without deformation at its ends by applying a nearly horizontal tension to the bladder. This upward tilt is very small, and the thickness of wall 19 tapers as it nears the tilted end of the skid so that the top of wall 19 never is higher than one-half inch above the surface upon which the skid rests.

Although skid 12 is shown disposed below bladder 14, it could also be placed above bladder 12 and could be provided with longitudinally extending vertical support walls to provide greater strength thereto. In addition, two skids may be used, one disposed above the bladder and one disposed below to capture the bladder therebetween for protection thereof.

Figure 1:
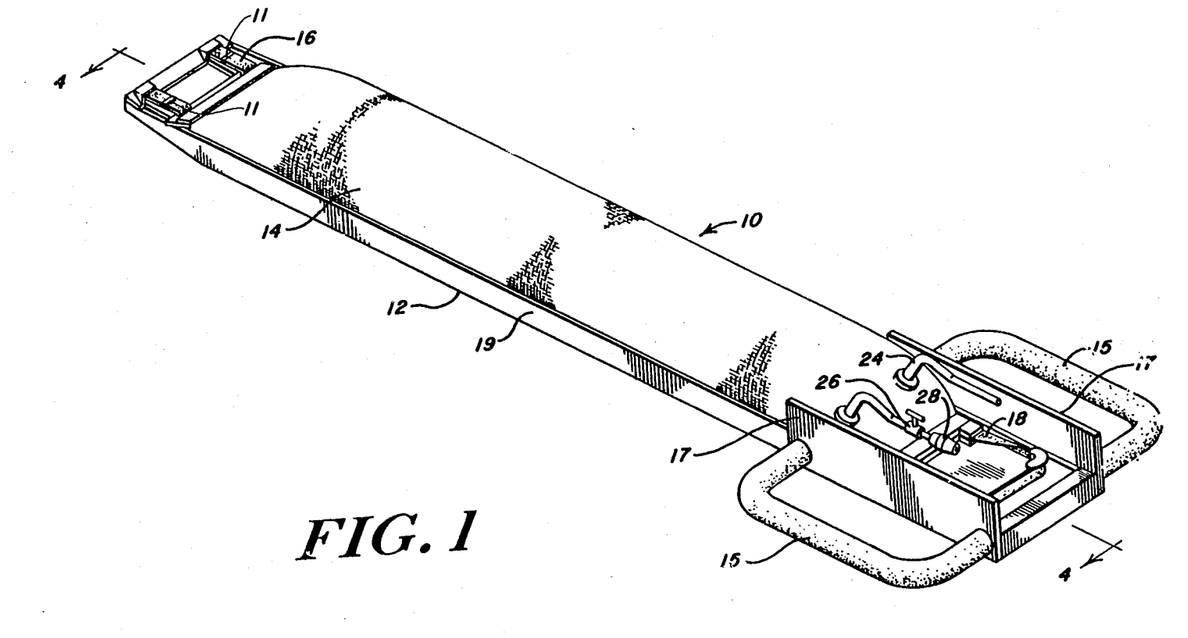
FIG. 1 is a pictorial view of one embodiment of the apparatus of this invention in an inflated condition.
Figure 2:
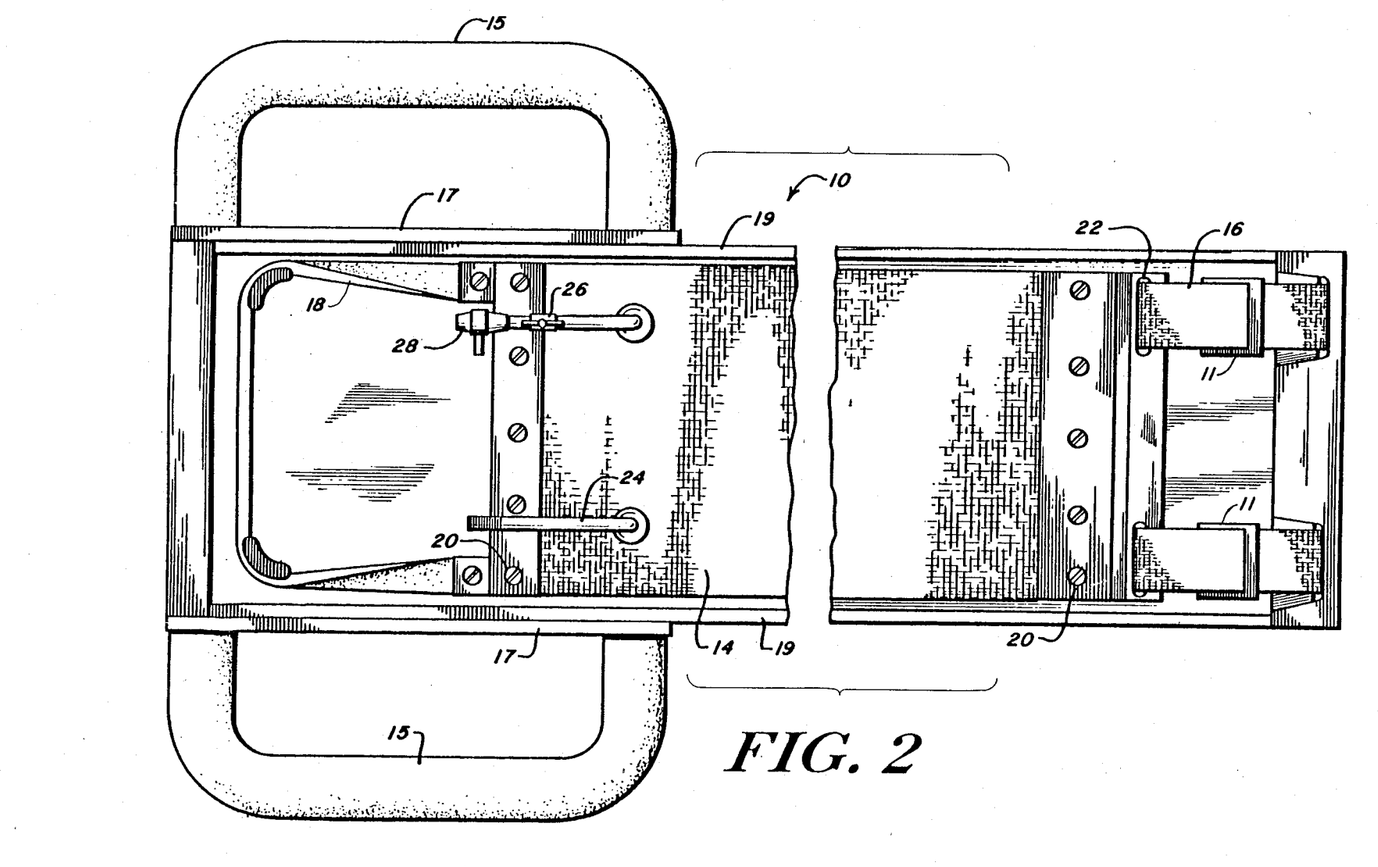
FIG. 2 is a top view of the apparatus of FIG. 1.

Bladder 14 may be formed of either an elastic material or a nonelastic material. In either event, it must be capable of being compressed into a small vertical thickness when deflated and be capable of expanding to a vertical height at least equal to the thickness of a fork arm when inflated. If the bladder is not formed of an elastic material, it preferably folds when deflated into a bundle having the desired height and a width no greater than that of the skid, as shown in FIG. 2. Bladder 14 also may be formed from a woven fabric surrounding an elastic interior bladder, the interlocking fibers providing the necessary expansion when inflated. Bladder 14 is preferably cylindrical when inflated, although it may also be oval, rectangular or triangular in cross-section. Typically, the bladder has a 4- or 5-inch diameter when inflated, and a ⅜-inch thickness when deflated, and it is capable of withstanding pressures of 200 psi or more.

The inflation valve is a one-way valve, such as a conventional tire valve, which closes when gas pressure is not applied thereto from an external source, while the deflation valve may be a petcock. The aspirator provides means for evacuating the bladder to allow it to lie flat and to prevent trapping of air therein. Typically, compressed air is used for inflation of the bladder although other gases or liquids may be used. In addition, a single two-way valve may be used for inflation and deflation instead of the dual valves illustrated herein.

An alternative preferred embodiment of the apparatus of this invention will now be described with reference to FIGS. 8 and 9. This embodiment is particularly suitable when the thickness of the stickers or spacers separating the stacked materials is less than one inch or where the upper and lower surfaces of the materials are uneven so that even though the stickers or spacers are one-inch thick, there is not a uniform one-inch spacing between the stacked materials. The apparatus of FIGS. 8 and 9 also is portable like the apparatus of FIGS. 1–4, and it also has sufficient rigity to allow it to be pushed into narrow spaces between stacked materials, but it is much lighter in weight and has a much thinner dimension when deflated.

Figures 8, 9:
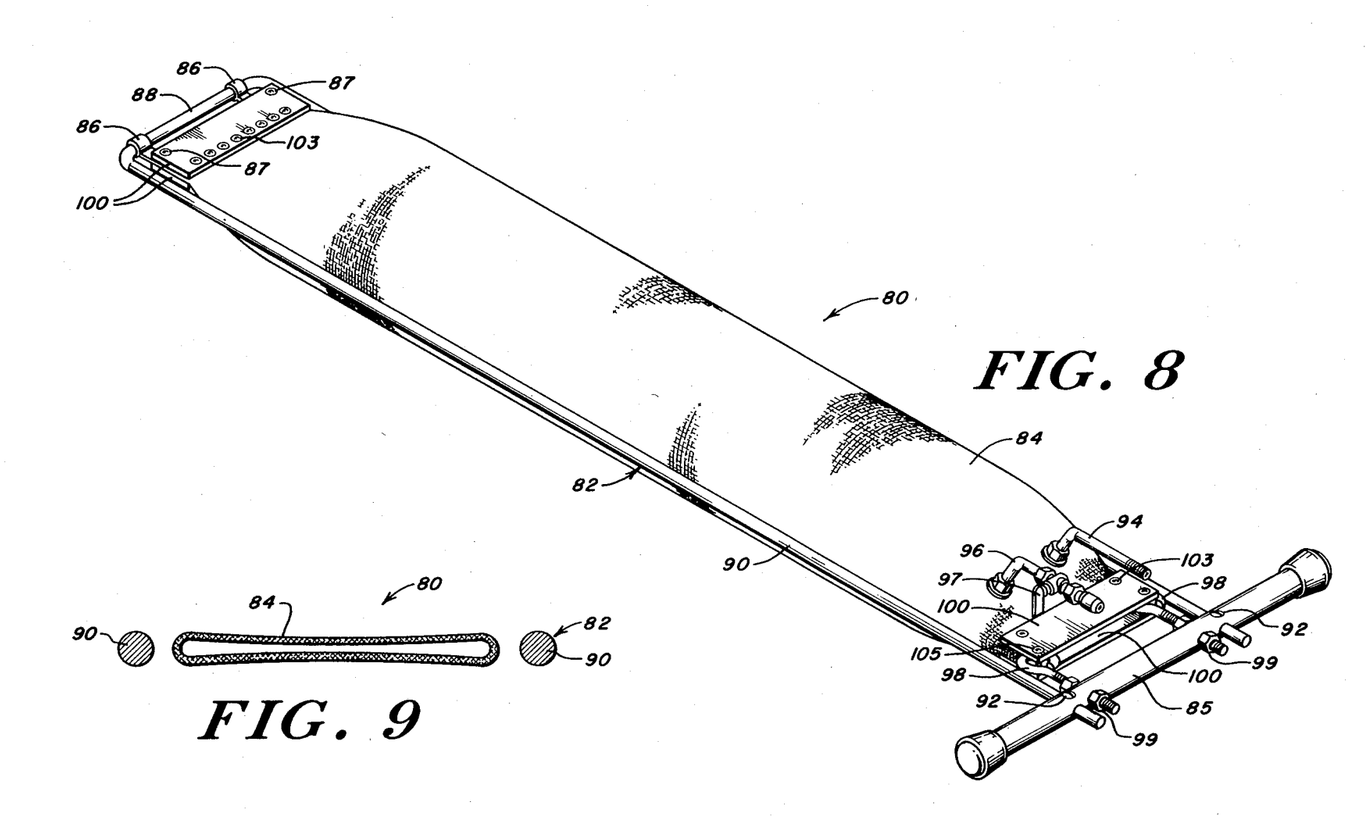
FIG. 8 is a pictorial view of another emobidment of the apparatus of this invention in an inflated condition.
FIG. 9 is a cross-sectional view of the apparatus of FIG. 8 in a deflated condition.

Apparatus 80 of FIGS. 8 and 9 includes an elongated inflatable bladder 84, a generally planar frame 82 which surrounds the bladder laterally on three sides and a handle 85. Frame 82 does not at any point extend over the top or bottom of bladder 84 so that it does not come between the bladder and the stacked materials. Frame 82 is typically composed of a length of stainless steel rod, preferably ⅜-inch in diameter. This length of rod is bent twice into the desired rectangular shape to form side portions 90 and end portion 88. Bladder 84 is stretched in its direction of elongation between handle 85 and end portion 88. The ends of side portions 90 of frame 82 are each anchored into handle 85. Typically side portions 90 each pass through a hole handle 85 and a bolt 92 passes through the intersection of each end of side portion 90 and handle 85 perpendicular the plane defined thereby for securing each side portion 90 to handle 85.

Bladder 84 may be identical in most respects to bladder 14 and need not be further described. Bladder 84 is sealed at each end, typically by confonting, parallel plates 100 which are clamped together to capture the ends of bladder 14 therebetween. Screws 103 may be used to clamp plates 100 together and they are recessed in one plate and threadably engaged mating holes in the other plate. In this manner, the thickness of the plates is minimized. Bladder 84 is secured at one end to end portion 88 by means of folded metal strips 86 which wrap around end portion 88 at spaced locations. The ends of strips 86 are captured between plates 100 by associated screws 87. Bladder 84 is secured at its other end to handle 85 by eye bolts 98. The eye portions of bolt 98 are captured between associated plates 100 by screws 105, while the threaded portions thereof pass through handle 85 and are secured thereto by cooperatively threaded nuts disposed on either side of handle 85. Tension on bladder 84 may be adjusted to the desired level by rotation of nuts 99. In this embodiment, there is no need to provide an elastic strap for maintaining the tension on bladder 84, because when bladder 84 is inflated, it expands equally about both sides of frame 82 so that there is little or no longitudinal shrinkage or vertical movement of bladder 84. Once eye bolts 98 and nuts 99 have been adjusted, further adjustment of the tension is unlikely to be needed.

An inflation valve 94, a deflation valve 96 and an aspirator 97 are also provided and may be similar to the corresponding inflation valve 24, deflation valve 26 and aspirator 28 of the embodiment of FIGS. 1–4.

This embodiment of FIGS. 8 and 9, when deflated, can be compressed into a height of only ⅜-inch, which corresponds to the diameter of the rods forming frame 82. This height, of course, excludes inflation valve 94, deflation valve 96 and aspirator 97 as well as handle 85 which is typically one inch in diameter. Apparatus 80, in a deflated condition, typically weighs about 9 pounds for a 72-inch length. Apparatus 80 can also be provided in the same lengths as apparatus 10. In this manner, apparatus 80 may be pushed into spaces between stacked materials, such as lumber, where the separation is no more than ⅜-inch at points, and where the materials extend over a length of up to seven feet. A five-foot long version of apparatus 80 is cable of lifting up to 15,000 pounds to a spacing of 4–5 inches. Apparatus 80 is sufficiently light to be fully portable, and handle 85 provides for ease of insertion and retraction and carrying of the apparatus. Because of its light weight, the apparatus may be pushed into high or hard-to-reach spaces for use at any location.

Figure 5:
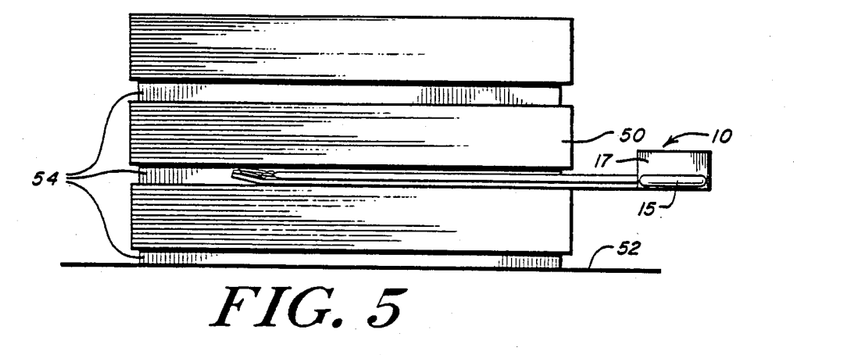
FIGS. 5, 6 and 7 illustrate the use of the apparatus of this invention in one application.
Figure 6:
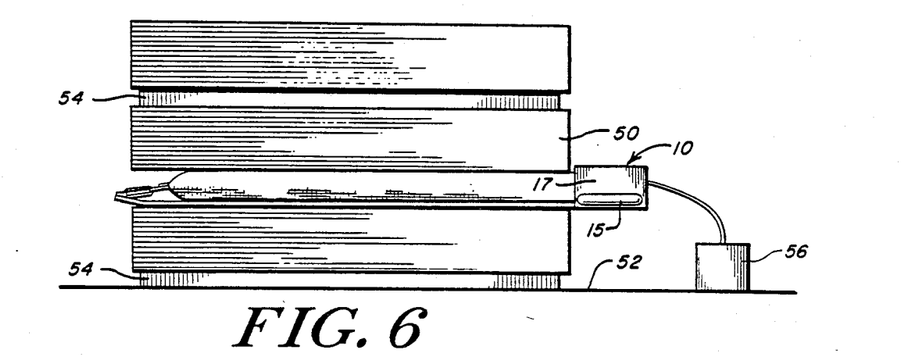
Figure 7:
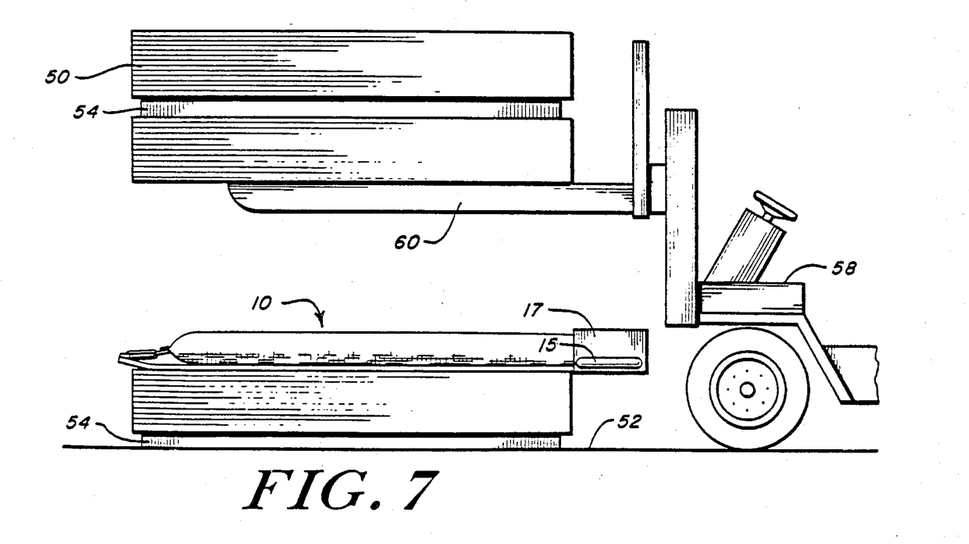

With reference now to FIGS. 5, 6 and 7, use of the apparatus 10 or 80 of this invention will be described. Although FIGS. 5–7 are described with particular reference to the embodiment of FIGS. 1–4, the embodiment of FIGS. 8 and 9 can also be used and would be used in exactly the same manner as described for the embodiment of FIGS. 1–4. A plurality of stacked materials or articles 50, such as lumber and the like, are illustrated in FIG. 5 resting on a lower support 52, such as the floor. Each article 50 or each group of articles 50 is separated by a plurality of spaced, horizontal wooden stickers or spacers 54 or the like arrayed along the horizontal extent of the stacked articles. Apparatus 10 of this invention in its uninflated condition, is pushed into the space between the stacked articles created by the stickers 54, as shown in FIG. 5. Typically, two apparatus 10 are utilized, each spaced from the other a horizontal distance approximately equal to the spacing between the fork arms of a forklift. The inflation valve is then coupled to a source of compressed gas 56 for inflation of the apparatus. During this period of time, the deflation valve is placed in a closed position to prevent leakage therethrough. Both apparatus are then inflated, either simultaneously or sequentially until the articles 50 above the device are raised from the articles 50 below the apparatus the desired vertical distance. The inflation valve then closes to retain the gas within bladder 14, and the source of compressed gas is removed. A forklift 58 is then deployed, the arms 60 of which are inserted into the vertical space created by the apparatus for lifting the articles 50 as shown in FIG. 7. When this procedure has been completed, the deflation valve is opened and the bladder is deflated by the aspirator to the condition shown in FIG. 1, and both apparatus are recovered.

Alternatively, only one apparatus may be used together with a bolster having a height generally equal to or less than the inflated height of apparatus to achieve the same result. One side of the stack is raised first using the apparatus as described, after which the bolster is inserted into the space created. Thereafter, the apparatus is deflated, removed to the opposite side of the stack and inserted and inflated. The forklift is then deployed to lift the stack, as shown in FIG. 7.

Apparatus 10 may be used for offloading, merely by reversing the steps of the above procedure. Thus, after stickers or spacers 54 have been put in place on lower support 52 a pair of apparatus of this invention may be placed in a horizontally spaced, parallel position on top of support 52 and inflated as shown in FIG. 7. A forklift may then deposit articles 50 on top thereof, after which the arms 60 of the forklift 58 are withdrawn. Both apparatus are then deflated by means of their deflation valves and aspirators until the bladder no longer bears against the underside of articles 50. At this point, the bladder may be withdrawn from between articles 50 and support 52. Alternatively, a single apparatus in conjunction with a bolster may be used in place of two apparatus to offload a stack of articles or materials, in a manner similar to that described for onloading. A bolster is placed on support 52 and an apparatus is placed on support 52 in spaced relation thereto. The articles 50 are then deposited on the bolster and apparatus, and the fork arms 60 are withdrawn. Apparatus is then deflated, removed and inflated adjacent the bolster. The bolster is removed and the apparatus is deflated and withdrawn from between articles 50 and support 52.

This invention is most advantageously used for stacking and unstacking lumber which is separated vertically by stickers which are approximately 1-inch or less thick and 2-inches wide and 4-feet to 8-feet long. Since an entire stack of lumber normally cannot be lifted at once by a forklift, this invention may be used to separate and lift sections of the stacked lumber as desired. The approximately ⅜-inch vertical dimension of one embodiment of this invention, when deflated, permits it to be used in most lumber stacking applications, as well as for stacking other unpalletized materials such as plywood or hardboard. The arms of a forklift need not be wedged between the stacked materials, and thus damage thereto is prevented. Permanent storage on pallets and bolsters is obviated, permitting a greater amount of material to be stacked in a given vertical space. Storage costs are reduced because of the greater amount stored in the available area and because expensive pallets need not be stored with the goods. This invention also permits loads resting on corrugated sheets which have been stapled to 1-inch by 2-inch stickers to be removed from the floors of trailers, railcars or storage areas with nonpowered lowlift hand trucks, a feature which is not possible with any existing material handling system. In addition, because 1-inch by 2-inch stickers can be used between each article of a stack, many different items may be stored on top of one another in the same stack without the need of pallets.

The above description is exemplary, and modifications and improvements are intended to fall within the scope of this invention as defined solely in the following claims.

What is claimed is:

1. Portable apparatus for providing a desired vertical separation between materials normally stacked with a minimum vertical separation of no more than one inch, said apparatus comprising:
   an elongated, inflatable bladder having a vertical dimension in a deflated condition less than said minimum vertical separation;
   means for providing rigidity to said bladder in its direction of elongation for allowing manual pushing of said bladder between the materials, said providing means comprising:
   a generally rigid frame at least partially surrounding said bladder, said frame having a thickness less than said minimum vertical separation, said frame being spaced from said bladder in both an inflated and a deflated condition; and
   means for adjustably tensioning said bladder between portions of said frame;
   means for inflating said bladder to an inflated condition, said bladder having a vertical dimension in its inflated condition at least equal to said desired vertical separation;
   means for deflating said bladder to return said bladder to its deflated condition for recovery of said bladder from between the materials; and
   means for manually grasping said bladder for carrying said bladder and for pushing said bladder manually into said minimum vertical separation.

2. The apparatus according to claim 1 wherein said desired vertical separation is no less than the thickness of a forklift arm.

3. The apparatus according to claim 1 wherein said bladder comprises an elastic tube having sealed ends.

4. Portable apparatus for providing a desired vertical separation between materials normally stacked with a minimum vertical separation of no more than one inch, said apparatus comprising:
   an elongated, inflatable bladder having a vertical dimension in a deflated condition less than said minimum vertical separation;
   means for providing rigidity to said bladder in its direction of elongation for allowing manual pushing of said bladder between the materials, said providing means comprising:
   a generally rigid skid elongated in the direction of elongation of said bladder; and
   elastic means for tensioning said bladder in said direction of elongation and for securing said bladder to said skid;
   means for inflating said bladder to an inflated condition, said bladder having a vertical dimension in its inflated condition at least equal to said desired vertical separation;
   means for deflating said bladder to return to said bladder to its deflated condition for recovery of said bladder from between the materials; and
   means for manually grasping said bladder for carrying said bladder and for pushing said bladder manually into said minimum vertical separation.

5. The apparatus according to claim 4 wherein an end of said skid spaced from said inflating means and said deflating means is angularly disposed upwardly towards said bladder with respect to the direction of elongation of said bladder.

6. Portable apparatus for providing a desired vertical separation between materials normally stacked with a minimum vertical separation of no greater than one inch using spacers, said apparatus comprising:

an elongated, generally rigid skid;

an elongated, inflatable single chamber bladder secured to said skid and resting thereon, said skid and said bladder together having a vertical dimension in a deflated condition less than said minimum vertical separation;

elastic means for tensioning said bladder on said skid in its direction of elongation, said tensioning means maintaining said bladder in an elongated condition while allowing horizontal shrinkage and vertical movement thereof during inflation of said bladder;

valve means for permitting inflation of said bladder to an inflated condition, said bladder having a vertical dimension in its inflated condition at least equal to said desired vertical separation;

means for deflating said bladder to return said bladder to its deflated condition for permitting manual recovering of said bladder and said skid from a space between the materials;

means for manually grasping said skid for pushing of said skid and said bladder into a space between the materials; and stop means for limiting the distance said skid and said bladder are manually inserted into a space between the materials in the direction of elongation of said skid for insuring that said valve means and said deflating means remain outside of the space between the materials.

7. Portable apparatus for providing a desired vertical separation between materials normally stacked with a minimum vertical separation of no greater than one inch using spacers, said apparatus comprising:

an elongated, inflatable, single-chamber bladder, said bladder having a vertical dimension in a deflated condition of less than said minimum vertical separation;

a rigid frame at least partially surrounding said bladder for providing rigidity to said bladder in its direction of elongation, said frame having a thickness no greater than said minimum vertical separation, said frame being spaced from said bladder at all times;

means for securing opposite, elongated ends of said bladder to said frame;

means for adjustably tensioning said bladder on said frame;

handle means associated with said frame for permitting manual pushing of said frame into said minimum vertical separation;

valve means for permitting inflation of said bladder to an inflated condition, said bladder having a vertical dimension in its inflated condition at least equal to said desired vertical separation; and means for deflating said bladder to return said bladder to its deflated condition for permitting manual recovery of said bladder from between the stacked materials.

* * * * *